United States Patent
Watanabe et al.

(10) Patent No.: US 11,910,806 B2
(45) Date of Patent: Feb. 27, 2024

(54) TRANSESTERIFIED FAT OR OIL

(71) Applicant: FUJI OIL HOLDINGS INC., Osaka (JP)

(72) Inventors: Shimpei Watanabe, Izumisano (JP); Yasuko Sato, Izumisano (JP); Nanako Kanda, Izumisano (JP); Akiyuki Ishiwata, Izumisano (JP)

(73) Assignee: FUJI OIL HOLDINGS INC., Osaka (JP)

(*) Notice: Subject to any disclaimer, the term of this patent is extended or adjusted under 35 U.S.C. 154(b) by 1033 days.

(21) Appl. No.: 16/498,677

(22) PCT Filed: Mar. 26, 2018

(86) PCT No.: PCT/JP2018/012103
§ 371 (c)(1),
(2) Date: Sep. 27, 2019

(87) PCT Pub. No.: WO2018/181159
PCT Pub. Date: Oct. 4, 2018

(65) Prior Publication Data
US 2020/0045991 A1    Feb. 13, 2020

(30) Foreign Application Priority Data

Mar. 31, 2017 (JP) .................. 2017-071399
Mar. 31, 2017 (JP) .................. 2017-071400

(51) Int. Cl.
*A23G 1/38* (2006.01)
*A23D 9/04* (2006.01)
*C11C 3/10* (2006.01)

(52) U.S. Cl.
CPC .............. *A23G 1/38* (2013.01); *A23D 9/04* (2013.01); *C11C 3/10* (2013.01); *A23V 2002/00* (2013.01)

(58) Field of Classification Search
CPC ............... A23G 1/38; A23D 9/04; C11C 3/10
See application file for complete search history.

(56) References Cited

U.S. PATENT DOCUMENTS

| | | | |
|---|---|---|---|
| 2,783,151 A | 2/1957 | Cochran et al. | |
| 3,595,673 A | 7/1971 | Seiden | |
| 4,208,445 A | 6/1980 | Cottier et al. | |
| 7,309,508 B2 | 12/2007 | Bach et al. | |
| 7,923,050 B2 | 4/2011 | Akahane et al. | |
| 8,361,531 B2 | 1/2013 | Zand et al. | |
| 8,623,444 B2 | 1/2014 | Ohara | |
| 2005/0142275 A1 | 6/2005 | Bach et al. | |
| 2010/0215810 A1 | 8/2010 | Zand et al. | |
| 2011/0008499 A1 | 1/2011 | Akahane et al. | |
| 2011/0177227 A1 | 7/2011 | Cruz Serna et al. | |
| 2012/0295010 A1 | 11/2012 | Ohara | |
| 2018/0352827 A1 | 12/2018 | Togashi | |

FOREIGN PATENT DOCUMENTS

| | | |
|---|---|---|
| CN | 103533840 | 1/2014 |
| JP | 2005-507028 | 3/2005 |
| JP | 2007-319043 | 12/2007 |
| JP | 2008-182961 | 8/2008 |
| JP | 2010-142152 | 7/2010 |
| JP | 2010-142153 | 7/2010 |
| JP | 2010-532802 | 10/2010 |
| JP | 2011-115075 | 6/2011 |
| JP | 2016-116486 | 6/2016 |
| WO | 2007/129590 | 11/2007 |
| WO | 2009/057451 | 5/2009 |
| WO | 2009/116396 | 9/2009 |
| WO | 2011/138918 | 11/2011 |
| WO | 2016/133004 | 8/2016 |
| WO | 2017/169623 | 10/2017 |

OTHER PUBLICATIONS

Extended European Search Report dated Dec. 11, 2020 in corresponding European Patent Application No. 18777592.9.
Office Action dated Jun. 29, 2022 in corresponding Chinese Patent Application No. 201880022595.7, with English language translation.
International Search Report dated Jun. 26, 2018 in corresponding International (PCT) Patent Application No. PCT/JP2018/012103.
International Preliminary Report on Patentability dated Oct. 1, 2019 in corresponding International (PCT) Patent Application No. PCT/JP2018/012103.
Edited by Japan Oil Chemist's Society, "The Handbook of Oil Chemistry: Lipids and Surfactants", Maruzen Inc., 2001, vol. 4, pp. 604.
The Second Office Action dated Oct. 12, 2022 in corresponding Chinese Patent Application No. 201880022595.7, with English language translation.

*Primary Examiner* — Jeffrey P Mornhinweg
(74) *Attorney, Agent, or Firm* — WENDEROTH, LIND & PONACK, L.L.P.

(57) ABSTRACT

The present invention addresses the problem of providing a chocolate which has a reduced trans fatty acid content and yet shows a high compatibility with cocoa butter, excellent blooming resistance and high meltability in mouth. A transesterified fat or oil wherein, in the constituting fatty acid composition thereof, the content of unsaturated fatty acids is regulated to not more than 10 mass % and the composition of other fatty acids is controlled to a preset content.

19 Claims, No Drawings

TRANSESTERIFIED FAT OR OIL

TECHNICAL FIELD

The present invention relates to an interesterified fat, and an oily food using the interesterified fat, especially a chocolate without tempering process.

BACKGROUND ART

A hard butter which is widely used as a cocoa butter substitute is broadly classified into a tempering hard butter, which requires temperature control process at the time of solidifying and molding, and a non-tempering hard butter, which does not require the temperature control process. The tempering hard butter contains a large amount of SUS triglyceride (S: saturated fat having 16 to 18 carbon atoms, U: monounsaturated fatty acid having 18 carbon atoms), which is rich in cocoa butter, and thus, has similar characteristics and physical properties as cocoa butter. Thus, it has high compatibility with cocoa butter, and it provides a texture similar to cocoa butter. However, it is desirable to skip the tempering process because it requires precise temperature control.

The non-tempering hard butter does not require the complicated tempering process, and thus can be suitably used in various combined food in which chocolate is combined with bread or confectionery. And, the non-tempering hard butter can be broadly classified into trans acid hard butter, interesterified/fractionated hard butter and lauric acid hard butter.

Among the non-tempering hard butter, trans acid hard butter obtained by hydrogenation of liquid oil such as soybean oil and rapeseed oil have been widely used due to good meltability in the mouth and high compatibility with cocoa butter. However, in recent years, the risk of trans fatty acid on health has been clarified, and low trans fatty acid hard butter containing no trans fatty acids is desired.

As above-mentioned, low trans acid hard butter is desired. Thus, in recent years, development of interesterified/fractionated hard butter has been promoted (Patent Documents 1 to 4). This interesterified/fractionated hard butter is obtained by subjecting raw material fat containing extremely low amount of trans fatty acid, such as extremely hydrogenated soybean oil or rapeseed oil, or solid fat such as palm oil to chemical or enzymatic interesterification, followed by fractionation. The interesterified/fractionated hard butter has a good meltability in the mouth. However, the costs are high due to the complexity of the production process, and cheaper hard butter is desired.

Lauric acid hard butter has been produced for a long time from fat rich in triglycerides containing a large amount of lauric acid, and examples thereof include fractionated hard fat of palm kernel oil, and coconut oil. These have various advantages such as texture and physical properties very similar to cocoa butter and good gloss, but bloom and graining are occurred rapidly during storage. Thus, a large amount of cocoa components and cocoa butter cannot be blended.

Patent Documents 5 to 9 disclose a fat composition for chocolate having low trans acid content, and containing a lauric fat.

PRIOR ART DOCUMENTS

Patent Documents

Patent Document 1: JP 2005-507028 A
Patent Document 2: JP 2010-532802 A
Patent Document 3: JP 2007-319043 A
Patent Document 4: WO 2011/138918 A
Patent Document 5: JP 2008-182961 A
Patent Document 6: JP 2010-142152 A
Patent Document 7: JP 2010-142153 A
Patent Document 8: JP 2011-115075 A
Patent Document 9: JP 2016-116486 A

SUMMARY OF INVENTION

Problems to be Solved by Invention

In recent years, consumer tends to demand deliciousness for chocolate. In a chocolate for coating, non-tempering hard butter is desired due to good workability. However, in a similar fashion, quality pursuing not only physical properties such as workability and solidification speed but also taste such as cacao feeling and chocolate feeling is required to also the chocolate for coating. The cacao feeling is a chocolate taste that can be felt more strongly by increasing the blending ratio of cacao mass in chocolate. Thus, cacao mass is necessary for imparting the cacao feeling and delicious chocolate taste, but about 55% by mass of cacao mass is cacao butter. When a large amount of cacao mass is blended, a large amount of cacao butter is contained at the same time, and fat bloom is generated in the coating without tempering, so that the blending ratio of cacao mass is limited.

The present inventors have considered an improvement in the quality and function of interesterified fat having a low trans acid content. The fat compositions for chocolate disclosed in Patent Documents 1 to 4, which have a low trans acid content and which do not contain lauric fat, tend to have poor meltability in the mouth. The fat compositions disclosed in Patent Documents 5 to 9 have a relatively good meltability in the mouth. However, it has been considered that further quality improvement is necessary, including the blending limit of cocoa butter, bloom resistance, and insufficient meltability in the mouth.

After considering such prior art technology, an object of the present invention is to provide an interesterified fat which enables to obtain a chocolate having superior compatibility with cocoa butter, bloom resistance, sharp melting characteristics and good meltability in the mouth while reducing trans acid content.

Means for Solving Problems

The present inventors have intensively studies to solve the above-mentioned problems. As a result, they have found that the problems may be solved by adjusting a content of unsaturated fatty acid in constituent fat to 10% by mass or less, and adjusting contents of other fatty acid components to determined contents. The present invention has been completed by these findings.

That is, the present invention provides:

(1) An interesterified fat satisfying the following (A) to (J):
 (A) a content of saturated fatty acids having 6 to 18 carbon atoms in constituent fatty acid composition is 90 to 99.5% by mass;
 (B) a content of saturated fatty acids having 6 to 10 carbon atoms in constituent fatty acid composition is 6 to 18% by mass;
 (C) a content of saturated fatty acids having 16 to 18 carbon atoms in constituent fatty acid composition is 25 to 50% by mass;

(D) a content of saturated fatty acids having 12 or less carbon atoms in constituent fatty acid composition is 35 to 60% by mass;
(E) a content of saturated fatty acids having 20 or more carbon atoms in constituent fatty acid composition, is 1% by mass or less;
(F) a content of lauric acid in constituent fatty acid composition is 20 to 50% by mass;
(G) a content of palmitic acid in constituent fatty acid composition is 20 to 38% by mass;
(H) a content of stearic acid in constituent fatty acid composition is 3 to 20% by mass;
(I) a content of unsaturated fatty acids in constituent fatty acid composition is 0.5 to 10% by mass;
(J) a content of trans fatty acids in constituent fatty acid composition is 5% by mass or less, wherein an analysis of the fatty acid composition is carried out after the fatty acid is propyl esterified;
(2) The interesterified fat of (1), wherein total content of (B) and (I) is 10% to 20% by mass, a content of CN30 to CN38 is 20 to 50% by mass, and a content of CN48 or more is 30% by mass or less, and wherein CN30 to CN38 is a triglyceride in which total number of carbon atoms in constituent fatty acids of the triglyceride in the fat is 30 to 38, and CN48 or more is a triglyceride in which total number of carbon atoms in constituent fatty acids of the triglyceride in the fat is 48 or more;
(3) The interesterified fat of (2), wherein (content of CN48 or more)/(content of CN28 or less) is 20 or less, wherein CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less;
(4) The interesterified fat any of (1) to (3), wherein raw material fat of the interesterification is a mixed oil of the following fat component X and fat component Y, wherein the fat component X is one or more fats selected from coconut oil, palm kernel oil, and processed fat thereof, and fat component Y is a fat containing 40% by mass to 100% by mass of palm stearin;
(5) The interesterified fat of (4), wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value;
(6) The interesterified fat any of (1) to (5), wherein the interesterified fat satisfies all of the following SFC %:
SFC at 10° C. is 85% to 100%,
SFC at 20° C. is 60% to 80%,
SFC at 25° C. is 45% to 70%,
SFC at 40° C. is 2% or less;
(7) The interesterified fat of (6), wherein (content of CN48 or more)/(content of CN28 or less) is 1.5 to 20, wherein the interesterified fat satisfies all of the following SFC %:
SFC at 10° C. is 85% to 100%,
SFC at 20° C. is 60% to 80%,
SFC at 25° C. is 45% to 70%,
SFC at 30° C. is 25% to 50%,
SFC at 35° C. is 3% to 30%,
SFC at 40° C. is 2% or less,
wherein CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less;
(8) The interesterified fat of (7), wherein the interesterified fat satisfies: (I) a content of unsaturated fatty acids in constituent fatty acid composition is 1 to 6% by mass, and wherein the interesterified fat satisfies all of the following SFC %:
SFC at 10° C. is 85% to 100%,
SFC at 20° C. is 65% to 80%,
SFC at 25° C. is 50% to 70%,
SFC at 30° C. is 25% to 50%,
SFC at 35° C. is 5% to 30%,
SFC at 40° C. is 2% or less;
(9) The interesterified fat any of (1) to (8), wherein the fat is for chocolate;
(10) A process for producing an interesterified fat including using a fat satisfying the following (A) to (J) as a raw material fat:
(A) a content of saturated fatty acids having 6 to 18 carbon atoms in constituent fatty acid composition is 90 to 99.5% by mass;
(B) a content of saturated fatty acids having 6 to 10 carbon atoms in constituent fatty acid composition is 6 to 18% by mass;
(C) a content of saturated fatty acids having 16 to 18 carbon atoms in constituent fatty acid composition is 25 to 50% by mass;
(D) a content of saturated fatty acids having 12 or less carbon atoms in constituent fatty acid composition is 35 to 60% by mass;
(E) a content of saturated fatty acids having 20 or more carbon atoms in constituent fatty acid composition, is 1% by mass or less;
(F) a content of lauric acid in constituent fatty acid composition is 20 to 50% by mass;
(G) a content of palmitic acid in constituent fatty acid composition is 20 to 38% by mass;
(H) a content of stearic acid in constituent fatty acid composition is 3 to 20% by mass;
(I) a content of unsaturated fatty acids in constituent fatty acid composition is 0.5 to 10% by mass;
(J) a content of trans fatty acids in constituent fatty acid composition is 5% by mass or less,
(11) The process for producing an interesterified fat of (10), wherein the fat satisfying 10% to 20% by mass of total content of (B) and (I) is used as the raw material fat, wherein a content of CN30 to CN38 after the interesterification is 20 to 50% by mass, and a content of CN48 or more after the interesterification is 30% by mass or less, and wherein CN30 to CN38 is a triglyceride in which total number of carbon atoms in constituent fatty acids of the triglyceride in the fat is 30 to 38, and CN48 or more is a triglyceride in which total number of carbon atoms in constituent fatty acids of the triglyceride in the fat is 48 or more;
(12) The process for producing an interesterified fat of (10) or (11), wherein the raw material fat of the interesterification is a mixed oil of the following fat component X and fat component Y, wherein the fat component X is one or more fats selected from coconut oil, palm kernel oil, and processed fat thereof, and fat component Y is a fat containing 40% by mass to 100% by mass of palm stearin;
(13) The process for producing an interesterified fat of (12), wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value.

Effect of Invention

The present invention enables to obtain an interesterified fat having sharp melting characteristics.

In a preferred embodiment, the interesterified fat of the present invention provides superior workability when used in chocolate due to its high solidification speed, while a content of saturated fatty acid having 16 or more carbon atoms, which deteriorates meltability in the mouth, is reduced.

In a preferred embodiment, a chocolate having reduced trans fatty acid content, superior compatibility with cocoa butter, superior bloom resistance, and good meltability in the mouth may be produced without tempering process by using the interesterified fat of the present invention to the chocolate.

In a more preferred embodiment, a chocolate for coating having good meltability in the mouth and good taste including cacao feeling may be produced without tempering process and with blending a large amount of cacao mass by using the interesterified fat to the chocolate for coating.

MODE FOR CARRYING OUT INVENTION

Hereinafter, the present invention will be described in more detail.

Examples of fats may be used in an interesterified fat of the present invention include vegetable fat such as rapeseed oil, soybean oil, sunflower seed oil, cottonseed oil, peanut oil, rice bran oil, corn oil, safflower oil, olive oil, kapok oil, sesame oil, evening primrose oil, palm oil, palm kernel oil, coconut oil, medium chain fatty acid binding oil (MCT), shea butter and sal fat; animal fat such as milk fat, beef tallow, lard, fish oil and whale oil; processed fat thereof such as hydrogenated fat, fractionated fat, hydrogenated fractionated fat, fractionated hydrogenated fat and interesterified fat; and mixed fat thereof.

An interesterified fat of the present invention satisfies the following (A) to (J):
(A) a content of saturated fatty acids having 6 to 18 carbon atoms in constituent fatty acid composition is 90 to 99.5% by mass;
(B) a content of saturated fatty acids having 6 to 10 carbon atoms in constituent fatty acid composition is 6 to 18% by mass;
(C) a content of saturated fatty acids having 16 to 18 carbon atoms in constituent fatty acid composition is 25 to 50% by mass;
(D) a content of saturated fatty acids having 12 or less carbon atoms in constituent fatty acid composition is 35 to 60% by mass;
(E) a content of saturated fatty acids having 20 or more carbon atoms in constituent fatty acid composition, is 1% by mass or less;
(F) a content of lauric acid in constituent fatty acid composition is 20 to 50% by mass;
(G) a content of palmitic acid in constituent fatty acid composition is 20 to 38% by mass;
(H) a content of stearic acid in constituent fatty acid composition is 3 to 20% by mass;
(I) a content of unsaturated fatty acids in constituent fatty acid composition is 0.5 to 10% by mass;
(J) a content of trans fatty acids in constituent fatty acid composition is 5% by mass or less, provided that an analysis of the fatty acid composition is carried out after the fatty acid is propyl esterified.

In characteristics of an interesterified fat of the present invention, an important difference from a non-tempering hard butter obtained by a conventional technology is that the above mentioned (I) a content of unsaturated fatty acids in constituent fatty acid composition is 0.5 to 10% by mass. It is preferably 1 to 8% by mass, more preferably 1 to 7% by mass, further preferably 1 to 6% by mass, and most preferably 1 to 5% by mass. When the content of unsaturated fatty acid is more than 10% by mass, it is not desirable because triglyceride having low melting point increases. When the content of unsaturated fatty acid is less than 0.5% by mass, triglyceride having low melting point may be too little. In addition, a content of oleic acid is preferably 0.5 to 7% by mass, more preferably 1 to 6% by mass, further preferably 1 to 5% by mass, and most preferably 1 to 4% by mass. When the content of oleic acid is more than 7% by mass, it is not desirable because triglyceride having low melting point increases. When the content of oleic acid is less than 0.5% by mass, triglyceride having low melting point may be too little.

It is speculated that lowering of melting point of interesterified fat may be suppressed and sharp melting characteristics may be obtained by the above mentioned (I) a content of unsaturated fatty acids in constituent fatty acid composition is 0.5 to 10% by mass and (B) a content of saturated fatty acids having 6 to 10 carbon atoms in constituent fatty acid composition is 6 to 18% by mass. Since the production of a triglyceride having low melting point may be reduced, a necessary amount of triglyceride having high melting point may be minimized, and thereby a good meltability in the mouth may be obtained when chocolate is produced. The reduced production of triglyceride having low melting point and the reduced production of triglyceride having high melting point also leads to a sharp melting characteristic obtained without performing fractionation. When the content of saturated fatty acids having 6 to 10 carbon atoms in constituent fatty acid composition is more than 18% by mass, it is not desirable because triglyceride having low melting point increases. When it is less than 6% by mass, it is not desirable because the desired medium melting point triglyceride is decreased and sharp melting characteristics may not be obtained. The content of the saturated fatty acid having 6 to 10 carbon atoms is preferably 6 to 18% by mass, more preferably 6 to 15% by mass, further preferably 7 to 15% by mass, and most preferably 8 to 15% by mass.

In an interesterified fat of the present invention, a content of saturated fatty acid having 6 to 18 carbon atoms in the constituent fatty acid composition is 90 to 99.5% by mass, preferably 95 to 99% by mass. When it is less than 90% by mass, desired sharp melting characteristics of interesterified fat may not be obtained. When it is more than 99.5% by mass, triglyceride having low melting point may be too little.

In an interesterified fat of the present invention, a content of lauric acid in the constituent fatty acid composition is 20 to 50% by mass, preferably 25 to 50% by mass, more preferably 25 to 45% by mass, and further preferably 30 to 45% by mass. When it is less than 20% by mass, a relative content of stearic acid and palmitic acid in saturated fatty acid content will be high, and thereby meltability in the mouth will be deteriorated and sharp melting characteristics will not be obtained. When the content of lauric acid is more than 50% by mass, a relative content of stearic acid and palmitic acid in saturated fatty acid content will be low, and the SFC % in the entire temperature range will be lowered, and thereby sharp melting characteristics may not be obtained.

In an interesterified fat of the present invention, a content of palmitic acid in the constituent fatty acid composition is 20 to 38% by mass, preferably 20 to 37% by mass, more preferably 20 to 36% by mass. By adjusting it to the range, desired sharp melting characteristics may be obtained. When it is more than 38% by mass, it is not desirable because meltability in the mouth will be deteriorated.

In an interesterified fat of the present invention, a content of stearic acid in the constituent fatty acid composition is 3 to 20% by mass, preferably 5 to 15% by mass. When it is more than 20% by mass, the meltability in the mouth will be deteriorated, and the desired meltability in the mouth of the interesterified fat may not be obtained. When it is less than 3% by mass, sharp melting characteristics may not be obtained.

In an interesterified fat of the present invention, a content of saturated fatty acid having 16 to 18 carbon atoms in the constituent fatty acid composition is 25 to 50% by mass, preferably 30 to 50% by mass. When it is more than 50% by mass, the meltability in the mouth will be deteriorated, and the desired meltability in the mouth of the interesterified fat may not be obtained.

In an interesterified fat of the present invention, a content of saturated fatty acid having 12 or less carbon atoms in the constituent fatty acid composition is 35 to 60% by mass, preferably 35 to 50% by mass. When it is less than 35% by mass, meltability in the mouth may be deteriorated in the case of where the content of a saturated fatty acid having 16 or more carbon atoms is relatively increased. When the content of unsaturated fatty acids having 16 or more carbon atoms is relatively increased, the desired sharp melting characteristics of the interesterified fat may not be obtained. Moreover, when it is more than 60% by mass, the desired sharp melting characteristics of the interesterified fat may not be obtained.

In an interesterified fat of the present invention, a content of saturated fatty acid having 20 or more carbon atoms in the constituent fatty acid composition is 1% by mass or less, preferably 0.5% by mass or less, more preferably 0.3% by mass or less. The interesterified fat of the present invention has sharp melting characteristics and a good solidification speed even when the saturated fatty acid having 20 or more carbon atoms is 1% by mass or less.

As used herein, a fatty acid composition of interesterified fat is measured in the same manner as that reported in Yoshinaga et al., "The Collaborative Study on the Enzymatic Analysis of Positional Distribution of Short- and Medium-chain Fatty Acids in Milk Fat Using Immobilized Candida Antarctica Lipase B", after that fatty acid residue is converted to propyl ester. In the usual method of measuring that fatty acid residue is methyl esterified using a strong alkali-methanol solution, the obtained value by the analysis may be small and the accuracy may be inferior especially in a content of short-chain fatty acids such as C6 to C8. By performing fatty acid composition analysis by propylation, the above problems may be alleviated and highly accurate measurement may be performed.

In an interesterified fat of the present invention, in the constituent fatty acid composition, the total content of (B) a content of saturated fatty acids having 6 to 10 carbon atoms and (I) a content of unsaturated fatty acids, in constituent fatty acid composition is 10% by mass to 20% by mass. By adjusting it within such a range, sharp melting characteristics may be obtained. When it is more than 20% by mass, it is not preferable because low melting point triglyceride may increase.

In an interesterified fat of the present invention, preferably, (content of CN48 or more)/(content of CN28 or less) is 20 or less, preferably 1.5 to 20, more preferably 2 to 20, further preferably 2 to 15, most preferably 2 to 10. It is preferable that the desired sharp melting characteristics may be easily obtained by making it within such a range. CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less.

In an interesterified fat of the present invention, a content of CN30 to CN38 (triglycerides in which the total number of carbon atoms in constituent fatty acids of triglycerides in the fat is 30 to 38) is 20 to 50% by mass, more preferably 20 to 40% by mass. A content of 20 to 50% by mass is preferable because sharp melting characteristics are easily obtained. When it is less than 20% by mass, the SFC % at 25° C. to 35° C. may be lowered.

In an interesterified fat of the present invention, a content of CN 48 or more (triglycerides in which the total number of carbon atoms in constituent fatty acids of triglycerides in the fat is 48 or more), is 30% by mass or less, more preferably 5 to 30% by mass, further preferably 5 to 20% by mass. When it is more than 30% by mass, triglyceride having high melting point may increase in the case of where the saturated fatty acid content is high, or the low melting point triglyceride may increase when the unsaturated fatty acid content is high. Thus, the sharp melting characteristics of the desired interesterified fat may not be obtained.

A fat to be used for an interesterified fat of the present invention is not particularly limited as long as the above-described constitution is satisfied. It is preferable that raw material fat of the interesterification is the following fat component X and fat component Y, and these components are mixed and the mixture is interesterified.

The fat component X is one or more fats selected from coconut oil, palm kernel oil and processed fat thereof.

The fat component Y is a fat containing 40% by mass to 100% by mass of palm stearin.

An interesterified fat of the present invention is more preferably obtained by mixing and interesterifying the following fat component X and fat component Y. It is preferable at the point that an adjustment of formulation becomes easy.

The fat component X is one or more fats selected from hydrogenated coconut oil, fractionated hydrogenated palm kernel oil, and fractionated palm kernel oil.

The fat component Y is a fat containing 40% by mass to 100% by mass of palm stearin.

An interesterified fat of the present invention is further preferably obtained by mixing and interesterifying the following fat component X and fat component Y. By using palm stearin having an iodine value of 20 or less, the (E) a content of unsaturated fatty acids in the constituent fatty acid composition may be reduced. And, it is preferable at the point that an adjustment of formulation becomes easy.

The fat component X is one or more fats selected from hydrogenated coconut oil, fractionated hydrogenated palm kernel oil, and fractionated palm kernel oil.

The fat component Y is a fat containing 40% by mass to 100% by mass of palm stearin having 20 or less of iodine value.

Interesterification processes are classified into two methods: a method of specifically exchanging only the fatty acids bound at position 1 and position 3 of a triglyceride using an enzyme (lipase) (1,3-position-specific interesterification), and a non-specific exchange method with no regard to binding site using an enzyme or a metal catalyst (e.g. sodium methylate) (random interesterification). In the present invention, "interesterification" preferably refers to the latter, namely random interesterification. The reason is that more triglyceride species are obtained, and thus a quality of chocolate without tempering is stabilized over a long period of time.

An interesterified fat of the present invention may be used for a chocolate. In a preferred embodiment, the interesterified fat of the present invention having sharp fat physical properties may be obtained without performing a fractionation step after the interesterification, and may be used for a chocolate. An amount of the interesterified fat of the present invention is 10 to 65% by mass, preferably 10 to 50% by mass, more preferably 15 to 45% by mass, with respect to the whole chocolate. When the interesterified fat of the present invention is less than 10% by mass, characteristics such as sharp meltability in the mouth and bloom resistance, solidification speed and gloss after solidification, and difficult to peel off from the coating when eaten may not be obtained in the case of where the chocolate is used for coating. When it is more than 65% by mass, the above-mentioned characteristics may be obtained, however the chocolate taste may become bland and a good flavor may not be obtained, and the oily feeling may become strong, and thus it is not preferable.

In addition, as used herein, "chocolate" is not limited to chocolate, quasi chocolate and chocolate-utilizing food defined by the Japan Fair Trade Council of Chocolate Industry and the Japan Fair Trade Council of Chocolate-Utilizing Foods, but also includes fat-processed food that has fat as an essential component and that utilizes cacao mass, cocoa, cocoa butter, cocoa butter equivalent, and hard butter.

An interesterified fat of the present invention preferably satisfies all of the following SFC %. It is preferable because characteristics such as sharp meltability in the mouth and no strong aftertaste may be obtained when used for a chocolate.
SFC at 10° C. is 85% to 100%,
SFC at 20° C. is 60% to 80%,
SFC at 25° C. is 45% to 70%,
SFC at 40° C. is 2% or less.

In addition, the interesterified of the present invention satisfies all of the following SFC % as a more preferable aspect by satisfying (content of CN48 or more)/(content of CN28 or less) of 1.5 to 20.
SFC at 10° C. is 85% to 100%,
SFC at 20° C. is 60% to 80%,
SFC at 25° C. is 45% to 70%,
SFC at 30° C. is 25% to 50%,
SFC at 35° C. is 3% to 30%,
SFC at 40° C. is 2% or less.
CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less.

In addition, the interesterified of the present invention satisfies all of the following SFC % as a more preferable aspect by satisfying 1 to 6% by mass of the unsaturated fatty acid content in the constituent fatty acid composition.

SFC at 10° C. is 85% to 100%,
SFC at 20° C. is 65% to 80%,
SFC at 25° C. is 50% to 70%,
SFC at 30° C. is 25% to 50%,
SFC at 35° C. is 5% to 30%,
SFC at 40° C. is 2% or less.

A fat content in chocolate is preferably 30 to 70% by mass, more preferably 40 to 60% by mass. When the fat content is low, viscosity of the chocolate may be too high and the chocolate may be difficult to use for coating. When the fat content is too high, chocolate may have bland taste and may become oily, and thus it is not preferable.

A process for preparing general chocolates may be used as a production process of chocolate containing an interesterified fat of the present invention. More specifically, the interesterified fat of the present invention is essential, and appropriate raw materials selected from various powdered foods such as sugar, cacao mass, cacao butter, cocoa powder, and milk powder; emulsifier; flavor; and colorant are mixed, and then subjected to roll-refining and conching to obtain chocolates.

An emulsifier usually used for a production of chocolate may be used for a chocolate containing an interesterified fat of the present invention. Examples include polyglycerin fatty acid ester, sucrose fatty acid ester, sorbitan fatty acid ester, organic acid monoglycerin fatty acid ester, polysorbate, and polyglycerin condensed ricinoleic acid ester. An emulsifier may be used alone or in combination of two or more emulsifiers.

A preferred use of an interesterified fat of the present invention is a chocolate for coating. In the present invention, the chocolate for coating is a processed fat in which fat forms a continuous phase, and examples thereof include chocolate for coating for coating or covering the surface of confectionery and bakery product.

A composite food coated with the coating chocolates in the present invention is not particularly limited as long as being a confectionery or a bakery product. Examples of confectioneries include manju (bun with a bean-jam filling), steamed youkan (adzuki-bean jelly), castella (Japanese sponge cake), dorayaki (bean-jam pancake), Imagawayaki (Japanese muffin filled with bean jam), taiyaki (fish-shaped pancake filled with bean jam), kintsuba (sword guard-shaped pancake filled with bean jam), waffle, chestnut manju, moon cake, bolo, yatsuhashi (sweet filled with red bean paste), rice cracker, karinto (fried dough cookie), doughnut, sponge cake, Swiss roll, angel cake, pound cake, baumkuchen, fruitcake, madeleine, cream puff, clair, mille-feuille, apple pie, tart, biscuit, cookie, cracker, steamed bread, pretzel, wafer, snack food, pizza pie, crepe, soufflé, and baignet, etc., or confectioneries in which fruit such as banana, apple or strawberry, etc. is coated with chocolate. Examples of bread include sandwich bread, hot dog bun, fruit bread, corn bread, butter-enriched roll, hamburger buns, baguette, bread roll, sweet roll, sweet dough, hardtack, muffin, bagel, croissant, Danish pastry, and naan, etc. Frozen dessert may also be used. However, normal-temperature use is preferred in order to obtain the effects of the invention.

A chocolate for coating containing an interesterified fat of the present invention is applied to coating after melting the chocolate for coating without tempering. Conditions for coating are preferably that the chocolate melted state is coated, and then quickly solidified at refrigeration temperature of 15° C. or less.

EXAMPLES

Hereinafter, the present invention will be described in more detail. In the Examples, both % and part are mass basis.

(Analysis Method)
(Analysis Method of Fatty Acid Composition by Propylation)

Fatty acid composition of fat is measured in the same manner as that reported in Yoshinaga et al., "The Collaborative Study on the Enzymatic Analysis of Positional Distribution of Short- and Medium-chain Fatty Acids in Milk Fat Using Immobilized Candida Antarctica Lipase B", after that fatty acid residue is converted to propyl ester instead of normal methyl esterification. Analysis with gas chromatography is carried out according to the Japan Oil Chemistry Association standard oil analysis method.

(Analysis Method of Triglyceride Composition)

Total carbon number of fatty acids constituting triglycerides in fat is measured according to the Japan Oil Chemists' Society "standard oil and fat analysis test method 2.4.6 triacylglycerin composition (gas chromatographic method)".

(SFC Measurement Method)

(SFC at each temperature) In measurement of (solidification rate), SFC is measured according to IUPAC.2 150 SOLID CONTENT DETERMINATION IN FATS BY NMR. As an analyzer, "minispec mq20" manufactured by Bruker is used.

(Parallel Measurements of SFC at Each Temperature)

In order to evaluate melting characteristics, fat is completely melted by holding them at 80° C. for 10 minutes and then holding them at 60° C. for 30 minutes, and then holding at 0° C. for 1 hour to solidify. Further, SFC (solid fat content) is measured after holding at a predetermined temperature (10° C., 20° C., 25° C., 30° C., 35° C., 40° C.) for 30 minutes.

(Solidification Speed)

After holding fat at 80° C. for 10 minutes, fat is completely melted by holding it at 60° C. for 30 minutes, and stabilized at 20° C., and SFC (solid fat content) after 3 to 30 minutes is measured.

After adding 1.5 g of sodium methylate as a catalyst to 1.0 kg of the raw material fat prepared at the ratio shown in Table 1, random interesterification was performed at 80° C. for 30 minutes, followed by washing with water/bleaching/deodorization according to a conventional method to obtain an interesterified fat. The results of analyzing the fatty acid composition according to the above-described analysis method of fatty acid composition are shown in Table 1. And, the results of analyzing the triglyceride composition according to the above-described analysis method of triglyceride composition are shown in Table 2. In Table 1, the iodine value was expressed as IV.

TABLE 1

Unit: mass %

| | | E1 | E2 | E3 | E4 | E5 | E6 | E7 | E8 | E9 | CE1 | CE2 | CE3 | CE4 | CE5 |
|---|---|---|---|---|---|---|---|---|---|---|---|---|---|---|---|
| Raw material fat | Palm stearin (IV12) | 35 | 30 | 25 | 20 | 15 | | 20 | 15 | 10 | | 40 | | | |
| | Extremely hydrogenated coconut oil (IV < 1) | 65 | 70 | 75 | 80 | 70 | 20 | 70 | 70 | 70 | | 60 | 30 | 53 | |
| | Palm stearin (IV30) | | | | | 6 | | 10 | 15 | 20 | 50 | | | | 15 |
| | Extremely hydrogenated palm oil (IV < 1) | | | | | 9 | 30 | | | | | | | 29 | |
| | Coconut oil | | | | | | 50 | | | | 40 | | 40 | | |
| | Extremely hydrogenated rapeseed oil (IV < 1) | | | | | | | | | | | | 30 | | |
| | Extremely hydrogenated high erucic rapeseed oil (IV < 1) | | | | | | | | | | 10 | | | | |
| | Rapeseed oil | | | | | | | | | | | | | 18 | |
| | Palm mid fraction (IV46) | | | | | | | | | | | | | | 35 |
| | Extremely hydrogenated palm kernel oil (IV < 1) | | | | | | | | | | | | | | 50 |
| | Interesterification reaction | Done | Done | Done | Done | Done | Done | Done | Done | Done | Done | Done | Done | Done | Done |
| Fatty acid composition | C6:0 | 0.2 | 0.2 | 0.2 | 0.3 | 0.2 | 0.2 | 0.2 | 0.2 | 0.2 | 0.1 | 0.2 | 0.2 | 0.1 | 0.0 |
| | C8:0 | 5.4 | 5.8 | 6.2 | 6.6 | 5.8 | 5.8 | 5.6 | 5.6 | 5.6 | 4.1 | 5.0 | 5.8 | 4.4 | 1.9 |
| | C10:0 | 4.1 | 4.3 | 4.7 | 5.0 | 4.3 | 4.3 | 4.3 | 4.3 | 4.3 | 3.1 | 3.7 | 4.3 | 3.3 | 1.7 |
| | C12:0 | 31.4 | 33.5 | 36.0 | 38.5 | 33.6 | 33.8 | 33.7 | 33.5 | 33.6 | 24.6 | 28.7 | 34.0 | 25.9 | 23.4 |
| | C14:0 | 12.0 | 12.9 | 13.6 | 14.4 | 13.1 | 13.0 | 12.9 | 12.9 | 13.0 | 9.8 | 11.1 | 12.8 | 10.1 | 8.3 |
| | C16:0 | 34.8 | 31.3 | 27.4 | 23.7 | 26.6 | 20.3 | 29.3 | 28.4 | 27.3 | 29.7 | 38.8 | 7.7 | 18.5 | 31.6 |
| | C18:0 | 8.2 | 8.8 | 8.9 | 9.2 | 13.0 | 19.2 | 8.8 | 9.0 | 9.0 | 7.3 | 8.1 | 31.5 | 21.7 | 13.7 |
| | C18:1 | 3.1 | 2.8 | 2.4 | 2.0 | 2.9 | 2.6 | 4.4 | 5.2 | 5.9 | 12.8 | 3.6 | 2.4 | 11.3 | 16.4 |
| | C18:2 | 0.6 | 0.4 | 0.5 | 0.4 | 0.6 | 0.5 | 0.8 | 1.0 | 1.2 | 2.9 | 0.7 | 0.5 | 3.3 | 3.0 |
| | C18:3 | 0.0 | 0.0 | 0.0 | 0.0 | 0.0 | 0.0 | 0.0 | 0.0 | 0.0 | 0.0 | 0.0 | 0.0 | 1.2 | 0.0 |
| | C20:0 | 0.0 | 0.0 | 0.0 | 0.0 | 0.0 | 0.3 | 0.0 | 0.0 | 0.0 | 0.9 | 0.0 | 0.6 | 0.0 | 0.0 |
| | C22:0 | 0.0 | 0.0 | 0.0 | 0.0 | 0.0 | 0.0 | 0.0 | 0.0 | 0.0 | 4.6 | 0.0 | 0.0 | 0.0 | 0.0 |
| | C24:0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Amount of saturated fatty acids having C6-18 | 96.2 | 96.8 | 97.1 | 97.6 | 96.5 | 97.0 | 94.8 | 93.8 | 92.9 | 84.3 | 95.7 | 97.1 | 84.1 | 80.6 |
| | Amount of saturated fatty acids having C6-10 | 9.8 | 10.3 | 11.1 | 11.9 | 10.3 | 10.3 | 10.1 | 10.0 | 10.1 | 7.4 | 8.9 | 10.4 | 7.8 | 3.6 |
| | Amount of saturated fatty acids having C16-18 | 43.1 | 40.2 | 36.4 | 32.8 | 39.6 | 39.5 | 38.2 | 37.3 | 36.3 | 37.0 | 47.0 | 39.2 | 40.3 | 45.3 |
| | Amount of saturated fatty acids having C12 or less | 41.2 | 43.7 | 47.1 | 50.4 | 43.9 | 44.1 | 43.7 | 43.6 | 43.7 | 32.0 | 37.6 | 44.4 | 33.7 | 27.1 |
| | Amount of saturated fatty acids having C20 or more | 0.0 | 0.0 | 0.0 | 0.0 | 0.0 | 0.3 | 0.0 | 0.0 | 0.0 | 5.5 | 0.0 | 0.6 | 0.0 | 0.0 |
| | Amount of unsaturated fatty acids | 3.8 | 3.2 | 2.9 | 2.4 | 3.5 | 3.0 | 5.2 | 6.2 | 7.1 | 15.7 | 4.3 | 2.9 | 15.9 | 19.4 |

TABLE 1-continued

| | E1 | E2 | E3 | E4 | E5 | E6 | E7 | E8 | E9 | CE1 | CE2 | CE3 | CE4 | CE5 |
|---|---|---|---|---|---|---|---|---|---|---|---|---|---|---|
| | | | | | | | | | | | | | Unit: mass % | |
| Total amount of saturated fatty acids having C6-10 and unsaturated fatty acids | 13.6 | 13.5 | 14.0 | 14.2 | 13.7 | 13.4 | 15.2 | 16.3 | 17.1 | 23.1 | 13.2 | 13.3 | 23.7 | 23.1 |
| Amount of trans fatty acids | <1 | <1 | <1 | <1 | <1 | <1 | <1 | <1 | <1 | <1 | <1 | <1 | <1 | <1 |

E: Example,
CE: Comparative Example (Evaluation of Analysis Value of Fatty Acid Composition)
Evaluation was made with the following numerical values (A) to (J):
(A) a content of saturated fatty acids having 6 to 18 carbon atoms in constituent fatty acid composition is 90 to 99.5% by mass;
(B) a content of saturated fatty acids having 6 to 10 carbon atoms in constituent fatty acid composition is 6 to 18% by mass;
(C) a content of saturated fatty acids having 16 to 18 carbon atoms in constituent fatty acid composition is 25 to 50% by mass;
(D) a content of saturated fatty acids having 12 or less carbon atoms in constituent fatty acid composition is 35 to 60% by mass;
(E) a content of saturated fatty acids having 20 or more carbon atoms in constituent fatty acid composition, is 1% by mass or less;
(F) a content of lauric acid in constituent fatty acid composition is 20 to 50% by mass;
(G) a content of palmitic acid in constituent fatty acid composition is 20 to 38% by mass;
(H) a content of stearic acid in constituent fatty acid composition is 3 to 20% by mass;
(I) a content of unsaturated fatty acids in constituent fatty acid composition is 0.5 to 10% by mass;
(J) a content of trans fatty acids in constituent fatty acid composition is 5% by mass or less.

(Discussion of Table 1)

The interesterified fats of Examples 1 to 9 satisfied all the numerical ranges of (A) to (J).

Comparative Example 2 showed 38.8% of palmitic acid content and did not satisfy (G).

Comparative Example 3 showed 31.5% of stearic acid content and did not satisfy (H). In addition, (E) was satisfied, however the content of saturated fatty acids having 20 or more carbon atoms was 0.6% by mass.

Comparative Example 1 did not satisfy the important (I), and did not satisfy (A), (D), and (E).

Comparative Example 4 did not satisfy the important (I) and did not satisfy (A), (D), (G), and (H).

Comparative Example 5 did not satisfy the important (I), and did not satisfy (A), (B), and (D).

TABLE 2

| | E1 | E2 | E3 | E4 | E5 | E6 | E7 | E8 | E9 | CE1 | CE2 | CE3 | CE4 | CE5 |
|---|---|---|---|---|---|---|---|---|---|---|---|---|---|---|
| | | | | | | | | | | | | | Unit: mass % | |
| CN22 | 0.2 | 0.3 | 0.4 | 0.5 | 0.2 | 0.3 | 0.3 | 0.3 | 0.3 | 0.0 | 0.2 | 0.2 | 0.1 | 0.0 |
| CN24 | 0.3 | 0.3 | 0.5 | 0.7 | 0.3 | 0.3 | 0.3 | 0.4 | 0.4 | 0.0 | 0.3 | 0.3 | 0.2 | 0.1 |
| CN26 | 1.0 | 1.0 | 1.5 | 1.9 | 1.0 | 1.0 | 1.1 | 1.1 | 1.1 | 0.1 | 1.0 | 1.0 | 0.5 | 0.4 |
| CN28 | 1.1 | 1.2 | 1.6 | 2.0 | 1.0 | 1.3 | 1.2 | 1.3 | 1.3 | 0.2 | 1.0 | 1.4 | 0.8 | 0.4 |
| CN30 | 1.7 | 1.8 | 2.2 | 2.6 | 1.8 | 1.7 | 1.9 | 1.8 | 1.8 | 0.5 | 1.6 | 1.6 | 1.1 | 0.9 |
| CN32 | 3.2 | 4.1 | 4.7 | 5.5 | 3.9 | 3.8 | 3.9 | 3.9 | 3.9 | 0.7 | 2.9 | 3.8 | 2.4 | 1.3 |
| CN34 | 4.1 | 5.0 | 5.7 | 6.6 | 4.8 | 4.7 | 4.8 | 4.8 | 4.8 | 1.2 | 3.6 | 4.5 | 2.7 | 1.2 |
| CN36 | 9.1 | 10.5 | 11.5 | 12.7 | 10.0 | 9.2 | 10.0 | 9.9 | 9.8 | 2.4 | 8.2 | 7.8 | 5.2 | 3.2 |
| CN38 | 9.6 | 10.8 | 11.7 | 12.7 | 10.8 | 10.8 | 10.7 | 10.7 | 10.7 | 2.9 | 8.7 | 10.9 | 4.3 | 4.0 |
| CN40 | 15.6 | 16.2 | 16.1 | 15.8 | 14.8 | 13.0 | 15.4 | 15.2 | 14.8 | 5.9 | 15.2 | 9.6 | 9.0 | 8.0 |
| CN42 | 13.9 | 14.3 | 14.2 | 13.9 | 14.9 | 15.3 | 14.6 | 14.7 | 14.8 | 6.8 | 13.4 | 15.7 | 13.9 | 11.5 |
| CN44 | 15.1 | 13.8 | 12.3 | 10.8 | 12.9 | 12.0 | 13.5 | 13.2 | 13.0 | 10.4 | 16.2 | 12.1 | 12.4 | 12.7 |
| CN46 | 11.5 | 10.2 | 9.0 | 7.7 | 11.0 | 11.0 | 10.8 | 10.9 | 11.0 | 12.2 | 12.1 | 8.1 | 13.5 | 17.3 |
| CN48 | 7.6 | 6.0 | 5.0 | 4.1 | 6.7 | 8.1 | 6.5 | 6.5 | 6.7 | 12.6 | 8.7 | 12.4 | 14.8 | 15.0 |
| CN50 | 4.3 | 3.2 | 2.5 | 2.0 | 3.7 | 4.1 | 3.6 | 3.6 | 3.7 | 13.8 | 5.0 | 4.8 | 7.5 | 11.3 |
| CN52 | 1.4 | 1.0 | 0.9 | 0.7 | 1.7 | 2.5 | 1.4 | 1.5 | 1.6 | 10.6 | 1.5 | 2.4 | 6.8 | 9.2 |
| CN54 | 0.2 | 0.1 | 0.0 | 0.0 | 0.3 | 0.9 | 0.2 | 0.2 | 0.3 | 8.6 | 0.2 | 3.3 | 4.5 | 3.3 |
| CN56 | 0.0 | 0.0 | 0.0 | 0.0 | 0.0 | 0.0 | 0.0 | 0.0 | 0.0 | 6.0 | 0.0 | 0.2 | 0.2 | 0.1 |
| CN58 or more | 0.0 | 0.0 | 0.0 | 0.0 | 0.0 | 0.0 | 0.0 | 0.0 | 0.0 | 5.2 | 0.0 | 0.0 | 0.0 | 0.0 |
| Amount of CN30-CN38 | 27.7 | 32.3 | 35.9 | 40.0 | 31.4 | 30.2 | 31.2 | 31.2 | 31.0 | 7.7 | 25.1 | 28.6 | 15.8 | 10.6 |
| Amount of CN48 or more | 13.6 | 10.4 | 8.5 | 6.8 | 12.4 | 15.6 | 11.7 | 11.9 | 12.3 | 56.7 | 15.4 | 23.0 | 33.8 | 39.0 |
| Amount of CN48 or more/amount of CN28 or less | 5.0 | 3.7 | 2.1 | 1.3 | 4.8 | 5.3 | 4.0 | 4.0 | 4.0 | 189.3 | 6.0 | 7.8 | 21.9 | 43.9 |

E: Example,
CE: Comparative Example (Evaluation of Analysis Value of Triglyceride)
1. A content of CN30 to CN38 is 20 to 50% by mass
2. A content of CN48 or more is 30% by mass or less
3. (Content of CN48 or more)/(Content of CN28 or less) is 20 or less (Discussion of Table 2)

Examples 1 to 9 and Comparative Examples 2 to 3 satisfied all the numerical ranges of 1 to 3 described above.

Example 4 showed low, 1.3 of (content of CN48 or more)/(content of CN28 or less), and there might be a relatively large amount of low melting point components.

Comparative Example 1 and Comparative Examples 4 to 5 did not satisfy all of the above 1 to 3.

SFC at each temperature in each fat was measured according to the above measurement method (SFC at each temperature). The results are shown in Table 3.

TABLE 3

| Solid fat content | E1 | E2 | E3 | E4 | E5 | E6 | E7 | E8 | E9 | CE1 | CE2 | CE3 | CE4 | CE5 Unit: % |
| --- | --- | --- | --- | --- | --- | --- | --- | --- | --- | --- | --- | --- | --- | --- |
| 10° C. | 91.7 | 89.8 | 89.2 | 87.8 | 90.2 | 91.5 | 89.2 | 88.3 | 87.2 | 82.3 | 92.2 | 90.2 | 80.2 | 87.2 |
| 20° C. | 73.8 | 71.1 | 68.8 | 64.6 | 72.1 | 71.5 | 69.6 | 67.0 | 64.5 | 57.5 | 76.7 | 70.8 | 56.0 | 64.8 |
| 25° C. | 58.6 | 56.5 | 51.3 | 45.9 | 55.6 | 55.3 | 52.2 | 49.3 | 46.7 | 41.4 | 62.2 | 55.3 | 39.7 | 49.4 |
| 30° C. | 38.8 | 33.7 | 29.2 | 23.0 | 34.5 | 33.9 | 31.1 | 28.1 | 25.9 | 24.2 | 43.8 | 34.4 | 22.3 | 31.4 |
| 35° C. | 14.8 | 9.6 | 5.4 | 1.5 | 10.5 | 10.8 | 7.7 | 6.0 | 4.5 | 9.2 | 20.2 | 12.1 | 8.3 | 15.2 |
| 40° C. | 0.2 | 0.0 | 0.0 | 0.0 | 0.1 | 0.2 | 0.0 | 0.0 | 0.0 | 0.0 | 2.4 | 2.2 | 0.4 | 3.1 |

E: Example,
CE: Comparative Example (Evaluation of SFC %)

Satisfying all the following numerical ranges was used as an index of sharp melting characteristics:
SFC at 10° C. is 85% to 100%,
SFC at 20° C. is 60% to 80%,
SFC at 25° C. is 45% to 70%,
SFC at 40° C. is 2% or less.

Satisfying all the following numerical ranges was used as an index of more preferable sharp melting characteristics:
SFC at 10° C. is 85% to 100%,
SFC at 20° C. is 60% to 80%,
SFC at 25° C. is 45% to 70%,
SFC at 30° C. is 25% to 50%,
SFC at 35° C. is 3% to 30%,
SFC at 40° C. is 2% or less.

Satisfying all the following numerical ranges was used as an index of further preferable sharp melting characteristics:
SFC at 10° C. is 85% to 100%,
SFC at 20° C. is 65% to 80%,
SFC at 25° C. is 50% to 70%,
SFC at 30° C. is 25% to 50%,
SFC at 35° C. is 5% to 30%,
SFC at 40° C. is 2% or less.

(Discussion of Table 3)

Examples 1 to 9, which satisfied all the numerical ranges of the evaluation of analysis value of fatty acid composition and the evaluation of analysis value of triglyceride composition, showed sharp melting characteristics.

Comparative example 2, in which a content of palmitic acid was more than 38% by mass, showed 2.4%, i.e. more than 2%, of SFC % at 35° C.

Comparative example 3, in which a content of stearic acid was more than 20% by mass, showed 2.2%, i.e. more than 2%, of SFC % at 35° C.

Comparative Example 1 and Comparative Examples 4 to 5 did not show sharp melting characteristics.

Except for Example 4, Examples 1 to 3 and Examples 5 to 9 satisfied more preferable sharp melting characteristics.

Except for Example 4 and Examples 8 to 9, Examples 1 to 3 and Examples 5 to 7 satisfied further preferable sharp melting characteristics.

Solidification speed was measured according to the above-described measurement method (solidification speed). The results are shown in Table 4.

TABLE 4

| Solid fat content cooled at 20° C. | E1 | E2 | E3 | E4 | E5 | E6 | E7 | E8 | E9 | CE1 | CE2 | CE3 | CE4 | CE5 Unit: % |
| --- | --- | --- | --- | --- | --- | --- | --- | --- | --- | --- | --- | --- | --- | --- |
| 3 minutes | 3.1 | 1.6 | 0.2 | 0.1 | 2.1 | 3.3 | 0.4 | 0.0 | 0.2 | 3.7 | 7.3 | 7.0 | 4.3 | 7.0 |
| 6 minutes | 20.2 | 18.5 | 9.5 | 3.7 | 18.2 | 14.8 | 13.3 | 8.5 | 6.9 | 10.7 | 28.9 | 14.2 | 10.8 | 22.8 |
| 10 minutes | 41.2 | 42.6 | 34.4 | 25.3 | 41.3 | 38.7 | 37.5 | 33.3 | 31.3 | 13.3 | 47.6 | 29.3 | 28.4 | 37.8 |
| 20 minutes | 57.0 | 56.2 | 51.3 | 46.8 | 54.9 | 54.2 | 52.1 | 49.4 | 47.4 | 39.9 | 59.3 | 54.3 | 40.5 | 47.2 |
| 30 minutes | 59.0 | 58.2 | 53.9 | 50.2 | 57.0 | 57.0 | 54.2 | 52.0 | 49.9 | 43.5 | 61.2 | 57.3 | 42.2 | 48.6 |

E: Example,
CE: Comparative Example (Discussion of Table 4)

Examples 1 to 9, which satisfied the constituent requirements, showed more than 20% of solid fat content after 10 minutes, and good results.

Comparative Example 1 containing a saturated fatty acid having 20 or more carbon atoms showed low solid fat content, 13.3% after 10 minutes, and inferior solidification rate required for hard butter.

(Evaluation of Interesterified Fat by Chocolate Test)

The interesterified fats of Examples 1 to 5, Examples 7 to 9, and Comparative Examples 1 to 3 produced above were evaluated by a chocolate test.

(Preparation of Non-Interesterified Lauric Fat 0)

Non-interesterified lauric fat 0 was prepared by mixing and extremely hydrogenating 95 parts of palm kernel oil. (iodine value 17) and 5 parts of palm oil (iodine value 52), and then purifying according to a conventional method. The C12 content was 46.7%, the iodine value was 1 or less, and the melting point was 43.4° C.

(Measuring Method)
(Average Particle Diameter)

Chocolate (if the oil content was less than 50%, chocolate was diluted with liquid oil and adjusted the oil content to 50 to 60%) was put on the measurement surface of a micrometer (manufactured by Mitutoyo Corporation, trade name "Digimatic Standard Outside Micrometer MDC-25PJ"), then the measurement surfaces are attached to each other, and the particle size was measured with protruding the chocolate from the measurement surface. The particle size was measured 5 times, and the average value of 3 measured values excluding the maximum and minimum values was defined as the average particle size.

(Viscosity)

The product temperature of chocolate was adjusted to 45° C., and the viscosity was measured with No. 3 rotor at 12 rpm when it is 10,000 cP or less, with No. 4 rotor at 12 rpm when it is more than 10,000 cP with a BM type viscometer (manufactured by Tokyo Keiki Co., Ltd.).

Chocolate was prepared according to the formulation in Table 5. Preparation was carried out with the same formulation except for the vegetable fat to be blended. Moreover, the measurement values of the prepared chocolates according to the (measurement method) are shown in Table 5.

TABLE 5

| Interesterified fat | E10 E1 | E11 E2 | E12 E3 | E13 E4 | E14 E5 | E15 E7 | E16 E8 | E17 E9 | CE6 CE1 | CE7 CE2 | CE8 CE3 |
|---|---|---|---|---|---|---|---|---|---|---|---|
| Sugar | | | | | 36.5 parts by mass | | | | | | |
| Cocoa butter | | | | | 14.3 parts by mass | | | | | | |
| Cocoa | | | | | 11.4 parts by mass | | | | | | |
| *Cacao* mass | | | | | 4.3 parts by mass | | | | | | |
| Emulsifier | | | | | 0.3 part by mass | | | | | | |
| Flavor | | | | | 0.03 part by mass | | | | | | |
| Adding amount of interesterified fat | | | | | 33.2 parts by mass | | | | | | |
| Particle size/μ | 21 | 21 | 21 | 21 | 21 | 21 | 21 | 21 | 21 | 21 | 21 |
| Viscosity/cP | 4400 | 4500 | 4200 | 4200 | 4200 | 4450 | 4750 | 4650 | 4700 | 4400 | 4450 |

E: Example,
CE: Comparative Example (Evaluation Criteria for Meltability in the Mouth)

The meltability in the mouth of the prepared chocolate was evaluated according to the following evaluation criteria. The evaluation results are shown in Table 6.

5 points: meltability in the mouth is very good and the remaining taste is not felt.
4 points: meltability in the mouth is good and the remaining taste is not felt.
3 points: meltability in the mouth is good and the remaining taste is hardly felt.
2 points: meltability in the mouth is slightly bad, the remaining taste is somewhat felt.
1 point: meltability in the mouth is bad and the remaining taste is felt.

(Evaluation of Bloom Resistance)

Chocolate was completely melted, and adjusted to 50° C., and then filled into a plastic cup at about 15 g, and immediately cooled at 5° C. The chocolate was solidified overnight at 5° C., and stood overnight at 20° C., and then stored in a constant temperature incubator at 17° C., 20° C., and 25° C., and the change with time of the chocolate was observed. The number of days from starting the test to occurrence of bloom is summarized in Table 7.

TABLE 6

| | E10 | E11 | E12 | E13 | E14 | E15 | E16 | E17 | CE6 | CE7 | CE8 |
|---|---|---|---|---|---|---|---|---|---|---|---|
| Meltability | 2 | 4 | 4 | 5 | 3 | 4 | 4 | 5 | 1 | 1 | 1 |

E: Example,
CE: Comparative Example

TABLE 7

|  | E10 | E11 | E12 | E13 | E14 | E15 | E16 | E17 | CE6 | CE7 | CE8 |
|---|---|---|---|---|---|---|---|---|---|---|---|
| 17° C. | 6 days | 8 days | 7 days | 7 days | 12 days | 6 days | 6 days | 5 days | 5 days | 6 days | 16 days |
| 20° C. | 4 days | 4 days | 4 days | 4 days | 5 days | 5 days | 5 days | 5 days | 4 days | 4 days | 12 days |
| 25° C. | 5 days | 5 days | 4 days | 3 days | 5 days | 5 days | 4 days | 3 days | 4 days | 4 days | 12 days |

E: Example,
CE: Comparative Example (Discussion of Table 6)
Example 10 to Example 17 had better meltability in the mouth than the Comparative Examples.
Examples 11 to 17 had further better meltability in the mouth.

(Discussion of Table 7)
Examples 10 to 17 had bloom resistance equivalent to or greater than that of Comparative Example 6.
Examples 10 to 16 were excellent in bloom resistance.
Examples 10 to 11 and Examples 14 to 16 were further excellent in bloom resistance.

(Overall Evaluation)
Overall evaluation of the chocolate was carried out in meltability in the mouth and bloom resistance according to the following criteria. An overall rating of 3 or higher was accepted. The evaluation results are shown in Table 8.
5: Very good
4: Good
3: Slightly good
2: Slightly bad
1: Bad

TABLE 8

|  | E10 | E11 | E12 | E13 | E14 | E15 | E16 | E17 | CE6 | CE7 | CE8 |
|---|---|---|---|---|---|---|---|---|---|---|---|
| Overall evaluation | 4 | 5 | 4 | 3 | 4 | 5 | 5 | 4 | 1 | 1 | 2 |

E: Example,
CE: Comparative Example (Discussion of Table 8)
Examples 10 to 17 were superior in overall evaluation to the Comparative Examples.
Examples 12 to 13 and 17 had good meltability in the mouth, however inferior in bloom resistance to those of Examples 10 to 11 and Examples 14 to 16.
Example 14 was excellent in bloom resistance, however inferior in meltability in the mouth.
Example 11 and Examples 15 to 16 were excellent in both meltability in the mouth and bloom resistance.
Example 11 had good meltability in the mouth and further improved bloom resistance.

(Evaluation of Interesterified Fat with Chocolate for Coaching)
A chocolate for coating was prepared according to Table 9. Evaluation was made in comparison with Comparative Example 9 using Comparative Example 1 which is a conventional product used for chocolate for coating.

TABLE 9

| Interesterified fat | Example 18 Example 2 | Comparative Example 9 Comparative Example 1 |
|---|---|---|
| Cacao mass | 33.0 parts by mass | |
| Sugar | 31.0 parts by mass | |
| Lactose | 5.0 parts by mass | |
| Cocoa | 4.0 parts by mass | |

TABLE 9-continued

| Interesterified fat | Example 18 Example 2 | Comparative Example 9 Comparative Example 1 |
|---|---|---|
| Vanilla flavor | 0.05 part by mass | |
| Fat O | 8.0 parts by mass | |
| Adding amount of interesterified fat | 19.0 parts by mass | |
| Particle size/µ | 23.0 | 23.0 |
| Viscosity/cP | 1900 | 1950 |

(Evaluation Method 2)
(1) Evaluation of Drying Time
Chocolate is completely melted and adjusted to 50° C., and coated to a commercially available stick bread. And, the time until the chocolate was solidified at room temperature (20 to 25° C.) was measured and evaluated. This time is called as drying time.

(2) Evaluation of Appearance (Gloss/Sweating)
The chocolate product coated in (1) was stored for half a day at room temperature (20 to 25° C.), and then gloss and sweating were evaluated by observing the surface condition.

(3) Evaluation of Texture (Meltability in the Mouth and Peeling)
The chocolate product coated in (1) was stored at room temperature (20 to 25° C.) for half a day, and then meltability in the mouth and peeling of the chocolate were evaluated by eating the chocolate.

(4) Evaluation of Heat Resistance (Stickiness)
The chocolate was completely melted and adjusted to 50° C., coated to a commercially available bread roll, cooled and solidified at 5° C. for 5 minutes, stored at 30° C. for 48 hours, and then the stickiness of the surface was evaluated. Stickiness means adhesion to a finger when the finger touches the chocolate surface.
The chocolate prepared was coated on a bread and evaluated according to (evaluation method 2). The evaluation results are shown in Table 10.

TABLE 10

|  | Example 18 | Comparative Example 9 |
|---|---|---|
| Drying time | 6 minutes 00 second | 6 minutes 20 seconds |
| Evaluation of appearance (gross) | Good | Good |
| Evaluation of appearance (sweating) | None | None |

TABLE 10-continued

|  | Example 18 | Comparative Example 9 |
|---|---|---|
|  | Drying time | |
|  | 6 minutes 00 second | 6 minutes 20 seconds |
| Evaluation of texture (peeling) | None | None |
| Evaluation of texture (meltability) | Good meltability | Remained in the mouth |
| Evaluation of heat resistance (stickiness) | None | None |

(Discussion of Table 10)

Both Example 18 and Comparative Example 9 were quickly solidified at room temperature, and showed good gloss, sweat resistance, peeling resistance, and heat resistance.

Example 18 showed good meltability in the mouth, and good expression of chocolate taste at the time of eating.

INDUSTRIAL APPLICABILITY

The present invention enables to obtain an interesterified fat having sharp melting characteristics and may be used to an oily food using the interesterified fat, especially chocolate without tempering process.

The invention claimed is:

1. A chocolate comprising an interesterified fat satisfying the following (A) to (J):
   (A) a content of saturated fatty acids having 6 to 18 carbon atoms in constituent fatty acid composition is 90 to 99.5% by mass;
   (B) a content of saturated fatty acids having 6 to 10 carbon atoms in constituent fatty acid composition is 6 to 18% by mass;
   (C) a content of saturated fatty acids having 16 to 18 carbon atoms in constituent fatty acid composition is 25 to 50% by mass;
   (D) a content of saturated fatty acids having 12 or less carbon atoms in constituent fatty acid composition is 35 to 60% by mass;
   (E) a content of saturated fatty acids having 20 or more carbon atoms in constituent fatty acid composition, is 1% by mass or less;
   (F) a content of lauric acid in constituent fatty acid composition is 20 to 50% by mass;
   (G) a content of palmitic acid in constituent fatty acid composition is 20 to 38% by mass;
   (H) a content of stearic acid in constituent fatty acid composition is 5 to 15% by mass;
   (I) a content of unsaturated fatty acids in constituent fatty acid composition is 0.5 to 10% by mass;
   (J) a content of trans fatty acids in constituent fatty acid composition is 5% by mass or less,
   wherein an analysis of the fatty acid composition is carried out after the fatty acid is propyl esterified,
   wherein a content of the interesterified fat in the chocolate is 10 to 65% by mass, and
   wherein the chocolate has bloom resistance due to the interesterified fat in the chocolate.

2. The chocolate according to claim 1, wherein the interesterified fat satisfies that total content of (B) and (I) is 10% to 20% by mass, a content of CN30 to CN38 is 20 to 50% by mass, and that a content of CN48 or more is 30% by mass or less, and wherein CN30 to CN38 is a triglyceride in which total number of carbon atoms in constituent fatty acids of the triglyceride in the fat is 30 to 38, and CN48 or more is a triglyceride in which total number of carbon atoms in constituent fatty acids of the triglyceride in the fat is 48 or more.

3. The chocolate according to claim 2, wherein the interesterified fat satisfies that (content of CN48 or more)/(content of CN28 or less) is 20 or less, wherein CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less.

4. The chocolate according to claim 1, wherein raw material fat of the interesterification is a mixed oil of the following fat component X and fat component Y, wherein the fat component X is one or more fats selected from coconut oil, palm kernel oil, and processed fat thereof, and fat component Y is a fat containing 40% by mass to 100% by mass of palm stearin.

5. The chocolate according to claim 4, wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value.

6. The chocolate according to claim 1, wherein the interesterified fat satisfies all of the following SFC %:
   SFC at 10° C. is 85% to 100%,
   SFC at 20° C. is 60% to 80%,
   SFC at 25° C. is 45% to 70%,
   SFC at 40° C. is 2% or less.

7. The chocolate according to claim 6, wherein the interesterified fat satisfies that (content of CN48 or more)/(content of CN28 or less) is 1.5 to 20,
   wherein the interesterified fat satisfies all of the following SFC %:
   SFC at 10° C. is 85% to 100%,
   SFC at 20° C. is 60% to 80%,
   SFC at 25° C. is 45% to 70%,
   SFC at 30° C. is 25% to 50%,
   SFC at 35° C. is 3% to 30%,
   SFC at 40° C. is 2% or less,
   wherein CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less.

8. The chocolate according to claim 7, wherein the interesterified fat satisfies: (I) a content of unsaturated fatty acids in constituent fatty acid composition is 1 to 6% by mass, and wherein the interesterified fat satisfies all of the following SFC %:
   SFC at 10° C. is 85% to 100%,
   SFC at 20° C. is 65% to 80%,
   SFC at 25° C. is 50% to 70%,
   SFC at 30° C. is 25% to 50%,
   SFC at 35° C. is 5% to 30%,
   SFC at 40° C. is 2% or less.

9. A process for producing a chocolate having bloom resistance comprising:
   providing an interesterified fat by subjecting a fat satisfying the following (A) to (J) as a raw material fat to chemical or enzymatic interesterification:
   (A) a content of saturated fatty acids having 6 to 18 carbon atoms in constituent fatty acid composition is 90 to 99.5% by mass;

(B) a content of saturated fatty acids having 6 to 10 carbon atoms in constituent fatty acid composition is 6 to 18% by mass;

(C) a content of saturated fatty acids having 16 to 18 carbon atoms in constituent fatty acid composition is 25 to 50% by mass;

(D) a content of saturated fatty acids having 12 or less carbon atoms in constituent fatty acid composition is 35 to 60% by mass;

(E) a content of saturated fatty acids having 20 or more carbon atoms in constituent fatty acid composition, is 1% by mass or less;

(F) a content of lauric acid in constituent fatty acid composition is 20 to 50% by mass;

(G) a content of palmitic acid in constituent fatty acid composition is 20 to 38% by mass;

(H) a content of stearic acid in constituent fatty acid composition is 5 to 15% by mass;

(I) a content of unsaturated fatty acids in constituent fatty acid composition is 0.5 to 10% by mass;

(J) a content of trans fatty acids in constituent fatty acid composition is 5% by mass or less, and preparing a chocolate by mixing the interesterified fat and chocolate raw materials, wherein a content of the interesterified fat in the chocolate is 10 to 65% by mass, and wherein the chocolate has bloom resistance due to the interesterified fat in the chocolate.

10. The process for producing a chocolate having bloom resistance according to claim 9, wherein the raw material fat of the interesterified fat is the fat satisfying 10% to 20% by mass of total content of (B) and (I), wherein a content of CN30 to CN38 of the interesterified fat is 20 to 50% by mass, and a content of CN48 or more of the interesterified fat is 30% by mass or less, and wherein CN30 to CN38 is a triglyceride in which total number of carbon atoms in constituent fatty acids of the triglyceride in the fat is 30 to 38, and CN48 or more is a triglyceride in which total number of carbon atoms in constituent fatty acids of the triglyceride in the fat is 48 or more.

11. The process for producing a chocolate having bloom resistance according to claim 9, wherein the raw material fat of the interesterification is a mixed oil of the following fat component X and fat component Y, wherein the fat component X is one or more fats selected from coconut oil, palm kernel oil, and processed fat thereof, and fat component Y is a fat containing 40% by mass to 100% by mass of palm stearin.

12. The process for producing a chocolate having bloom resistance according to claim 11, wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value.

13. The chocolate according to claim 8, wherein the interesterified fat satisfies that total content of (B) and (I) is 10% to 20% by mass, a content of CN30 to CN38 is 20 to 50% by mass, and a content of CN48 or more is 30% by mass or less, and wherein CN30 to CN38 is a triglyceride in which total number of carbon atoms in constituent fatty acids of the triglyceride in the fat is 30 to 38, and CN48 or more is a triglyceride in which total number of carbon atoms in constituent fatty acids of the triglyceride in the fat is 48 or more, wherein the interesterified fat satisfies that (content of CN48 or more)/(content of CN28 or less) is 20 or less, wherein CN48 or more is a triglyceride in which total number of carbon atoms in constituent fatty acids of the triglyceride in the fat is 48 or more, and CN28 or less is a triglyceride in which total number of carbon atoms in constituent fatty acids of the triglyceride in the fat is 28 or less, wherein raw material fat of the interesterification is a mixed oil of the following fat component X and fat component Y, and wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value.

14. The process for producing a chocolate according to claim 10, wherein the raw material fat of the interesterification is a mixed oil of the following fat component X and fat component Y, wherein the fat component X is one or more fats selected from coconut oil, palm kernel oil, and processed fat thereof, and fat component Y is a fat containing 40% by mass to 100% by mass of palm stearin.

15. The process for producing a chocolate according to claim 14, wherein the fat component X is one or more fats selected from hydrogenated coconut oil, fractionated hydrogenated palm kernel oil, and fractionated palm kernel oil, and the fat component Y is a fat containing 40% by mass to 100% by mass of palm stearin having 20 or less of iodine value.

16. The chocolate according to claim 13, wherein the interesterified fat satisfies the following (A) to (J):

(A) a content of saturated fatty acids having 6 to 18 carbon atoms in constituent fatty acid composition is 95 to 99% by mass;

(B) a content of saturated fatty acids having 6 to 10 carbon atoms in constituent fatty acid composition is 8 to 15% by mass;

(C) a content of saturated fatty acids having 16 to 18 carbon atoms in constituent fatty acid composition is 30 to 50% by mass;

(D) a content of saturated fatty acids having 12 or less carbon atoms in constituent fatty acid composition is 35 to 50% by mass;

(E) a content of saturated fatty acids having 20 or more carbon atoms in constituent fatty acid composition, is 0.3% by mass or less;

(F) a content of lauric acid in constituent fatty acid composition is 30 to 45% by mass;

(G) a content of palmitic acid in constituent fatty acid composition is 20 to 36% by mass;

(H) a content of stearic acid in constituent fatty acid composition is 5 to 15% by mass;

(I) a content of unsaturated fatty acids in constituent fatty acid composition is 1 to 5% by mass;

(J) a content of trans fatty acids in constituent fatty acid composition is 1% by mass or less.

17. The chocolate according to claim 16, wherein the interesterified fat satisfies: (K) a content of oleic acid in constituent fatty acid composition is 1 to 4% by mass.

18. The process for producing a chocolate according to claim 15, wherein the raw material fat of the interesterified fat satisfies the following (A) to (J):

(A) a content of saturated fatty acids having 6 to 18 carbon atoms in constituent fatty acid composition is 95 to 99% by mass;

(B) a content of saturated fatty acids having 6 to 10 carbon atoms in constituent fatty acid composition is 8 to 15% by mass;

(C) a content of saturated fatty acids having 16 to 18 carbon atoms in constituent fatty acid composition is 30 to 50% by mass;
(D) a content of saturated fatty acids having 12 or less carbon atoms in constituent fatty acid composition is 35 to 50% by mass;
(E) a content of saturated fatty acids having 20 or more carbon atoms in constituent fatty acid composition, is 0.3% by mass or less;
(F) a content of lauric acid in constituent fatty acid composition is 30 to 45% by mass;
(G) a content of palmitic acid in constituent fatty acid composition is 20 to 36% by mass;
(H) a content of stearic acid in constituent fatty acid composition is 5 to 15% by mass;
(I) a content of unsaturated fatty acids in constituent fatty acid composition is 1 to 5% by mass;
(J) a content of trans fatty acids in constituent fatty acid composition is 1% by mass or less.

19. The process for producing a chocolate according to claim 18, wherein the interesterified fat satisfies: (K) a content of oleic acid in constituent fatty acid composition is 1 to 4% by mass.

\* \* \* \* \*